US011669656B2

(12) United States Patent
Banks et al.

(10) Patent No.: US 11,669,656 B2
(45) Date of Patent: Jun. 6, 2023

(54) SYSTEMS AND METHODS FOR RUNNING A SIMULATION

(71) Applicant: OnScale, Inc., Cupertino, CA (US)

(72) Inventors: Robbie Banks, Redwood City, CA (US); Gerald Harvey, San Francisco, CA (US); Andy Tweedie, Glasgow (GB); Ryan Diestelhorst, Atlanta, GA (US); Josh Oster-Morris, Atlanta, GA (US); Laura Carcione, Los Altos, CA (US); Scott McClennan, Sunnyvale, CA (US); Jonathan McLaughlin, Glasgow (GB); Jeff Dobson, Glasgow (GB); Ian Campbell, San Jose, CA (US); David Freed, Burlingame, CA (US)

(73) Assignee: OnScale, Inc., Cupertino, CA (US)

( * ) Notice: Subject to any disclaimer, the term of this patent is extended or adjusted under 35 U.S.C. 154(b) by 168 days.

(21) Appl. No.: 16/856,222

(22) Filed: Apr. 23, 2020

(65) Prior Publication Data

US 2020/0342148 A1    Oct. 29, 2020

Related U.S. Application Data

(60) Provisional application No. 62/837,270, filed on Apr. 23, 2019.

(51) Int. Cl.
*G06F 30/20* (2020.01)
*G06F 9/54* (2006.01)
*G06F 111/02* (2020.01)

(52) U.S. Cl.
CPC .............. *G06F 30/20* (2020.01); *G06F 9/54* (2013.01); *G06F 2111/02* (2020.01)

(58) Field of Classification Search
CPC ......... G06F 30/20; G06F 9/54; G06F 2111/02
(Continued)

(56) References Cited

U.S. PATENT DOCUMENTS

| 7,716,031 B2 | 5/2010 | Vanspauwen et al. |
| 7,742,905 B2 | 6/2010 | Vanspauwen et al. |

(Continued)

OTHER PUBLICATIONS

International Search Report and Written Opinion dated Jul. 21, 2020, from International Application No. PCT/US2020/029437, 8 pages.

*Primary Examiner* — Andre Pierre Louis
(74) *Attorney, Agent, or Firm* — Meunier Carlin & Curfman LLC

(57) ABSTRACT

Systems and methods are provided to move the solving of multi-physics engineering simulations away from specific CAE, or combination CAD and CAE, applications. In one embodiment, an Application Programming Interface (API) is provided that can be integrated into any device, system, application, or software workflow. The API exposes a series of functions or modules that a user can use to create a simulation file that includes parameters such as a model for the simulation, physics for the simulation, timings for the simulation, and other parameters. The simulation file may then be executed on one or more nodes of a cloud-based computer cluster, and the results of executing the simulation can be provided back to the user. The user may then visualize the results using their preferred device, software, application, or workflow.

20 Claims, 5 Drawing Sheets

(58) Field of Classification Search
USPC .......................................................... 703/2, 6
See application file for complete search history.

(56) References Cited

U.S. PATENT DOCUMENTS

| | | |
|---|---|---|
| 8,626,475 B1 | 1/2014 | Fontes et al. |
| 8,793,115 B2 | 7/2014 | Vanspauwen et al. |
| 8,949,089 B1 | 2/2015 | Fontes et al. |
| 9,098,106 B2 | 8/2015 | Danielsson et al. |
| 9,208,270 B2 | 12/2015 | Fontes et al. |
| 9,253,211 B2 | 2/2016 | Hoole et al. |
| 9,323,503 B1 | 4/2016 | Fontes et al. |
| 9,454,625 B2 | 9/2016 | Danielsson et al. |
| 9,621,593 B2 | 4/2017 | Hoole et al. |
| 9,794,294 B2 | 10/2017 | Hoole et al. |
| 10,019,544 B2 | 7/2018 | Bertilsson et al. |
| 10,061,611 B2 | 8/2018 | Tarasuk-Levin et al. |
| 10,348,770 B2 | 7/2019 | Hoole et al. |
| 10,402,906 B2 | 9/2019 | Crabtree et al. |
| 10,454,791 B2 | 10/2019 | Crabtree et al. |
| 10,514,954 B2 | 12/2019 | Crabtree et al. |
| 2016/0098025 A1* | 4/2016 | Mansouri ................ G05B 17/02 700/29 |
| 2017/0343984 A1* | 11/2017 | Czinger ................ B33Y 50/02 |
| 2018/0089349 A1* | 3/2018 | Rezgui .................. G06T 19/006 |
| 2019/0179977 A1* | 6/2019 | Van der Velden ...... G06F 30/20 |
| 2021/0124859 A1* | 4/2021 | Sovani .................... G06F 30/18 |

* cited by examiner

100

SYSTEMS AND METHODS FOR RUNNING A SIMULATION

CROSS-REFERENCE TO RELATED APPLICATIONS

This application claims the benefit of priority to U.S. Provisional Patent Application No. 62/837,270 filed on Apr. 23, 2019, entitled "SIMULATION WORKFLOW ABSTRACTION," the contents of which are hereby incorporated by reference in its entirety.

BACKGROUND

Computer-aided engineering (CAE) is the practice of modeling and simulating virtual representations of physical objects using numerical computational methods such as finite element method (FEM) and finite difference time-domain (FDTD). Modern numerical analysis for CAE is tightly coupled with CAD and is performed almost exclusively in one of two workflows: 1) Numerical analysis is performed by the same computer application that the user used to generate the CAD model; or 2) the CAD model is imported into a separate CAE application, where the inputs to the numerical analysis are defined on the imported model.

There are several drawbacks associated with both approaches. First, with respect to using the same application for CAD and CAE, the user is limited to the CAD and CAE features of a single application, even where other applications may offer more advanced CAD and/or CAE features. Second, with respect to importing the CAD model into a separate CAE application, ensuring that the format used by the CAD application is suitable for the CAE application can be time consuming.

SUMMARY

Systems and methods are provided to move the solving of multi-physics engineering simulations away from specific CAE, or combination CAD and CAE, applications. In one embodiment, an Application Programming Interface (API) is provided that can be integrated into any device, system, application, or software workflow. The API exposes a series of functions or modules that a user can use to create a simulation file that includes parameters such as a model for the simulation, physics for the simulation, timings for the simulation, and other parameters. The simulation file may then be executed on one or more nodes of a cloud-based computer cluster, and the results of executing the simulation can be provided back to the user. The user may then visualize the results using their preferred device, software, application, or workflow.

The systems and methods provided herein provide many advantages over prior art systems and methods. First, because the described API can be used to bring engineering simulation features into any CAD application, users can continue to use their preferred CAD applications without having to compromise with respect to CAE and engineering simulations. Second, because the performing of the simulations is moved away from a user's personal computer and onto one or more nodes of a cloud-based computing cluster, more complicated simulations may be performed and with a much faster completion time than were previously possible.

In an embodiment, a method for abstracting an engineering simulation workflow is provided. The method includes: providing a simulation file; providing an application programming interface (API) configured to interface with the simulation file, wherein the API comprises a plurality of modules configured to receive inputs from an originating computing device and edit the simulation file based on the received inputs; transmitting the simulation file to a simulation computing device over a network; and performing a simulation using the simulation file at the simulation computing device.

Embodiments may include some or all of the following features. The simulation computing device may be a computing cluster comprising a plurality of nodes. Performing the simulation of the simulation file may include performing different portions of the simulation in parallel using the computing cluster. The API may be further configured to generate one or more standardized containers for performing the simulation, the method further including transmitting the one or more standardized containers over the network to the computing cluster for installation on the simulation computing device. The API may be embedded inside engineering software running on the originating computing device. The simulation file may be transmitted to the simulation computing device over the network via a network interface. The network interface may be configured to encrypt the simulation file. The network interface may be embedded inside engineering software running on the originating computing device. The plurality of modules may include a computer-aided design (CAD) model module, a materials module, a physics module, a boundary conditions module, a simulation inputs module, and a timing parameters module. The method may further include providing results of the simulation to the originating computing device. The results may be provided in a standardized format for visualization on the originating computing device.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
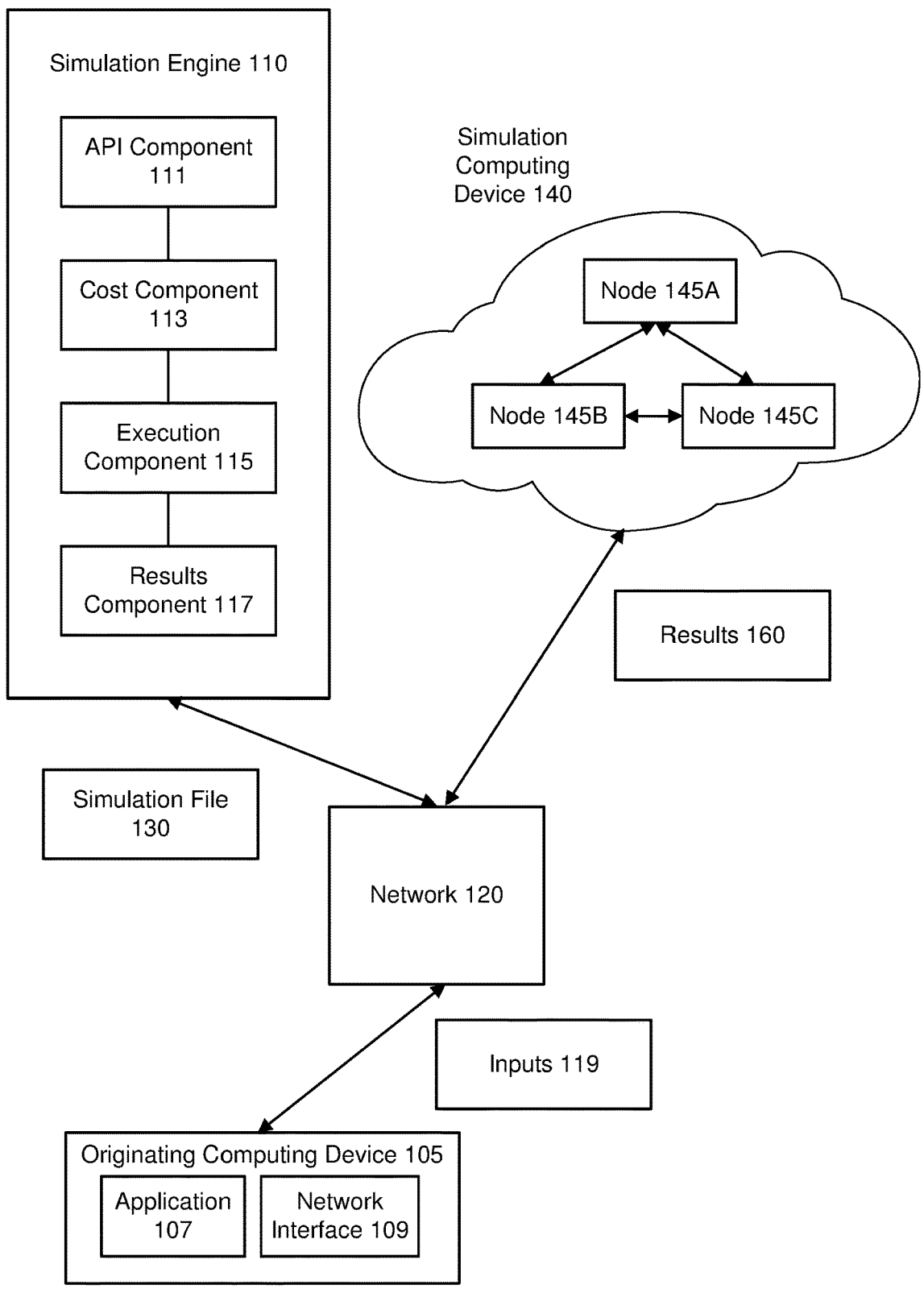
FIG. 1 is an illustration of an exemplary environment for running a simulation on a simulation computing device.

FIG. 1 is an illustration of an exemplary environment 100 for performing simulations in a computing cluster via an API by a simulation engine 110. As shown, the simulation engine 110 includes several components including, but not limited to, an API component 111, a cost component 113, an execution component 115, and a results component 117. More or fewer components may be supported. The various components of the simulation engine 110 may be implemented together, or in part, by the computing device 500 illustrated with respect to FIG. 5.

The API component 111 may expose an application programming interface (API) that allows any device, system, application, or workflow to create and run a simulation of a CAD model. As used herein, simulation, or engineering simulation, is the process of analyzing a digital prototype of a physical model (e.g., a CAD model) to determine how it behaves in response to physical stimuli that may include a variety of physics types (mechanical, electrical, thermal, fluid, etc).

The API component 111 may receive inputs 119 from an application 107 executing on an originating computing device 105 through a network 120. The inputs 119 may relate to a desired simulation such as a simulation of a CAD model. The network 120 may be a variety of network types including a local area network or the Internet. The originating computing device 105 may be a personal computing device associated with a user. The application 107 may be an engineering application (e.g., CAD application) or any other type of application that may incorporate simulations and/or simulation data.

In some embodiment, the originating computing device 105 may provide the inputs 119 through a network interface 109. The network interface 109 may encrypt the inputs 119 prior to providing the inputs 119 to the API component 111. Any type of encryption may be used.

The API component 111 may receive the inputs 119 from the application 107 and may use the inputs 119 to create and edit what is referred to herein as a simulation file 130. The simulation file 130 may include a plurality of parameters that control the execution of the simulation. Depending on the embodiment, the API component 111, through the API, may provide or expose a function or module that corresponds to each parameter of the simulation file 130. Each function or module may receive a corresponding input 119 and may edit or create the corresponding parameter in the simulation file 130 using the received input 119.

Figure 2:
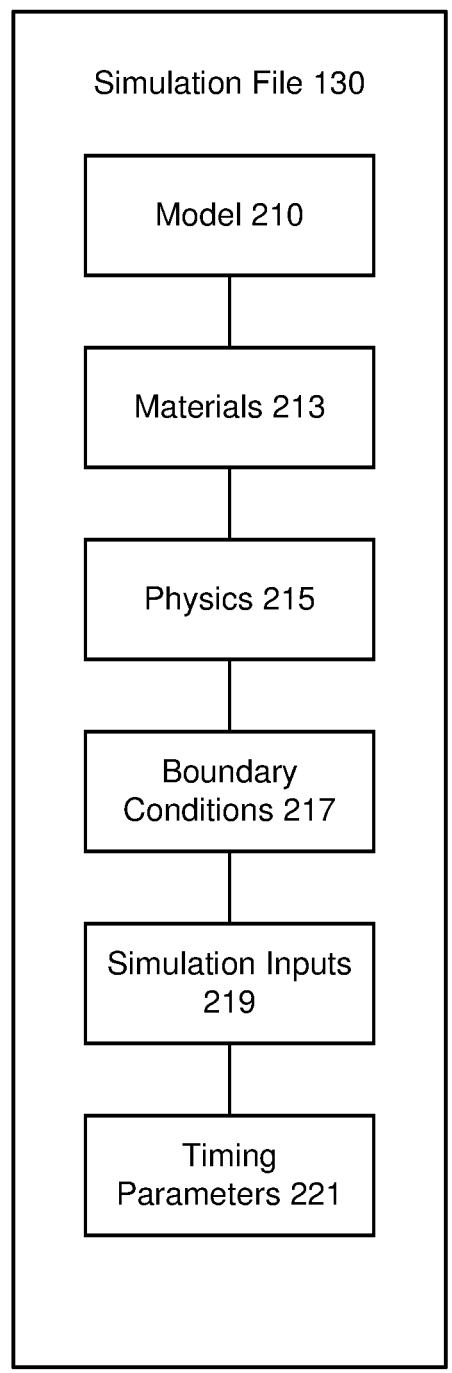
FIG. 2 is an illustration of an example simulation file.

Continuing to FIG. 2 is shown an example simulation file 130. As shown, the simulation file 130 includes several parameters, including, but not limited to a model 210, materials 213, physics 215, boundary conditions 217, simulation inputs 219, and timing parameters 221. More or fewer parameters may be included in the simulation file 130.

The model 210 may be a standardized CAD model that represents the particular device or structure that will be simulated. The model 210 may include a finite-element mesh that discretizes the device or structure represented by the model 210. Any type of model 210 may be used. The model 210 may have been created by the user using the application 107 on the originating computing device 105. Because each type or brand of application 107 may use a different model format, in some embodiments, the API component 111 may covert a model 210 provided as part of the inputs 119 into a format used by the simulation file 130 and supported by a simulation computing device 140 that will be used to run or execute the simulation.

The materials 213 may be identifiers of the materials used for the various surfaces and volumes of the model 210. The materials 213 may include plastics, metals, types of wood, etc. In addition, the materials 213 may include properties of each identified material. The properties may include physical, chemical, mechanical, optical, thermal, and electrical properties of the materials. Other properties may be included. Depending on the embodiment, the materials 213 may include a mapping of each material to the volumes, surfaces, and other structures of the model 210.

The physics 215 may include the various physics that may be applied to the model 210 during the simulation. The physics may include mechanical physics 215, thermal physics 215, electrical or electrostatic physics 215, electromagnetics physics 215, and fluid dynamic physics 215. Other types of physics 215 may be supported. Also included in the physics 215 may be indications of where on the model 210 each of the physics 215 may be applied during the simulation (e.g., the particular locations on the volumes and surfaces that make up the model 210).

The boundary conditions 217 may include parameters that define the effects of the various physics 215 at the spatial limits of the model 210 or internal surfaces of the model. Depending on the embodiment, each physic 215 may be associated with one or more boundary conditions 217.

The simulation inputs 219 may be the inputs that will act on the model 210 during the simulation. The simulation inputs 219 may include physical inputs 219 (e.g., forces), thermal inputs 219 (e.g., heat), electrical or electrostatic inputs 219 (e.g., electrical currents and/or voltages), electromagnetic inputs 219 (e.g., magnetic fields), and optical inputs 219 (e.g., light). Depending on the type of simulation input 219, each simulation input 219 may have a magnitude and direction and may indicate where on the model 210 it may be applied (e.g., the locations on the surfaces and/or volumes of the model 210).

The timing parameters 221 may define the time and resolution at which the simulation will be performed. Depending on the embodiment, the timing parameters 221 may at least include a time duration for the simulation. Other information may be provided in the timing parameters 221.

Returning to FIG. 1, the API component 111 may receive the inputs 119 from the application 107 and may construct and/or edit the simulation file 130 based on the inputs 119. In some implementations, the API component 111 may have a function or module that edits a corresponding part of the simulation file 130 using the inputs 119. Thus, the API component 111 may include a model module that edits the model 210 of the simulation file 130, a material set module that edits the materials 213 of the simulation file 130, a physics module that edits the physics 215 of the simulation file 130, a boundary conditions module that edits the boundary conditions 217 of the simulation file 130, a simulation inputs module that edits the simulations inputs 219 of the simulation file 130, and a timing parameters module that edits the timing parameters 221 of the simulation file 130.

After the API module 111 completes the simulation file 130 based on the inputs 119, the cost component 113 may optionally estimate a cost and/or time for the execution of the simulation corresponding to the simulation file 130 on the simulation computing device 140. The simulation computing device 140 may be a cloud-based computing cluster and may be made up of a plurality of nodes 145 (e.g., the nodes 145A, 145B, and 145C). Each node 145 may be made up of one or more computing devices such as the computing system 500. While only three nodes 145 are shown it is for illustrative purposes only; there is no limit to the number of nodes 145 that may be supported by the simulation computing device 140.

The cost component 113 may estimate the cost and/or time for running the simulation based on a variety of factors such as the complexity of the simulation file 130 (e.g., the size and complexity of the model 210, the length of the simulation, and the number of physics 215). The cost component 113 may further consider the number of nodes 145 that are available to execute the simulation, as well any costs charged by the owner or host of the simulation computing device 140.

In some implementations, the user of the originating computing device 105 may specify one or more execution preferences for the simulation. The execution preferences may be provided to the cost component 113 along with the inputs 119. The execution parameters may specify some or all of a desired turn-around time for the simulation (e.g., is the simulation a rush simulation, or can the user wait to receive the results 160 of the simulation), a service level agreement for the simulation, and a desired number of nodes 145 to use to execute the simulation.

The cost component 113 may estimate the cost and/or time to run the simulation based in part of the execution preferences. For example, if the execution parameters specified a high service level or a quick turn around time, the cost component 113 may estimate a higher cost and lower time than if the execution parameters specified a low quality of service or slow turn around time.

The cost component 113 may provide the estimated cost and/or time to the user of the application 107, and if the user accepts, the execution component 115 may attend to execution or performance of the simulation according to the simulation file 130. In some implementations, the execution component 115 may attend to execution of the simulation by installing one or more containers on the nodes 145 of the simulation computing device 140. Each container may include the necessary software to perform the simulation including multi-physics solvers. An example of a suitable container is a docker.

In some embodiments, the execution component 115 may break up the model 210 of the simulation file into a plurality of portions and may place each portion of the model 210 (and simulation file 130) into a separate container. The execution component 115 may then execute each container in a separate node 145 of the simulation computing device 140. The containers may be executed substantially in parallel.

Where the containers are executed in parallel on multiple nodes 145, at least one node 145 may be a primary node 145 and the other nodes 145 may be secondary nodes 145. The primary node 145 may control the execution of the simulation on the other nodes 145 and may combine the output of each node 145 into a single set of results 160. For example, the node 145A may be the primary node 145 and may control the execution of the simulation in parallel on the nodes 145B and 145C, which may be secondary nodes 145.

After the simulation corresponding to the simulation file 130 is completed by the simulation computing device, the results component 117 may provide the results 160 of the simulation to the application 107 via the network 120. The results 160 may be received through the network interface 109 and may be displayed and/or rendered to the user by the application 107 on the originating computing device 105. The user may then view and interact with the results 160 as if they had been generated by the application 107. Alternatively, or additionally, the results 160 may be stored for later retrieval by the application 107 by the results component 117 and/or the simulation computing device 140. For example, the user of the originating computing device 105 may use a function exposed by the API component 111 to retrieve the results 160. Depending on the embodiment, the results 160 may be encrypted by the results component 117 before they are provided to the application 107.

Figure 3:
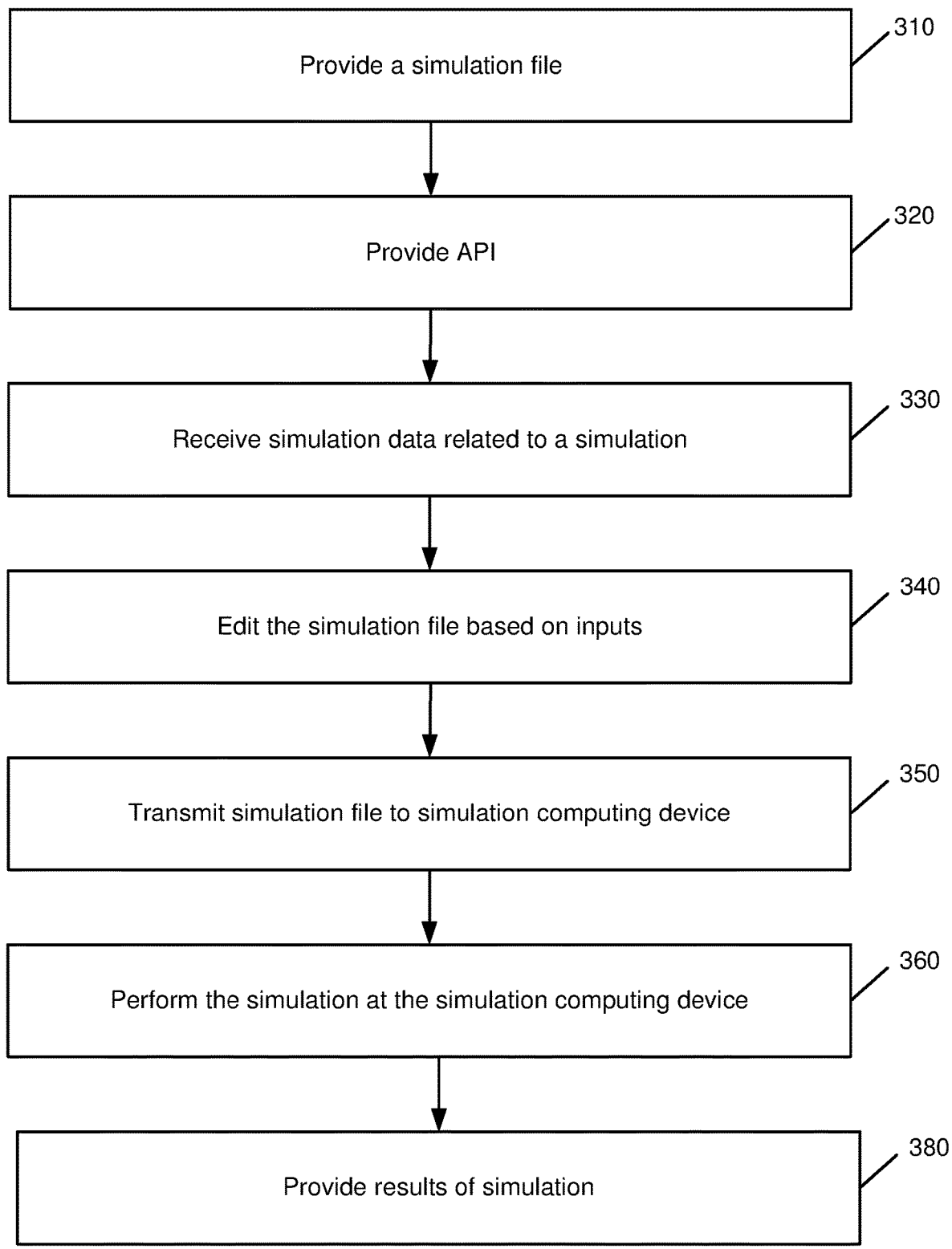
FIG. 3 is an operational flow of an implementation of a method for running a simulation on a simulation computing device.

FIG. 3 is an operational flow of an implementation of a method 300 for running a simulation on a simulation computing device. The method 300 may be implemented by the simulation engine 110 and the simulation computing device 140.

At 310, a simulation file is provided. The simulation file 130 may be provided by the API component 111 of the simulation engine 110. The simulation file 130 may be a standardized file that may allow for the execution of a corresponding simulation on a simulation computing device 140. The simulation computing device 140 may be a cloud-based cluster computing device that includes a plurality of nodes 145.

At 320, an API is provided. The API may be provided by the API component 111. The API may be a set of functions or modules that are adapted to edit the simulation file 130 based on inputs 119 provided by a user. The inputs 119 may define a simulation that the user desires to perform on a model 210.

At 330, inputs related to a simulation are provided. The inputs 109 may be provided by the user through the API using an application 107 executing on an originating computing device 105 associated with the user. The inputs 119 may be provided to the API component 111 using a network interface 109 connected to a network 120. In some embodiment, the network interface 109 may encrypt the inputs 119 and the API component 111 may receive the encrypted inputs 119. Any method for encryption may be used.

At 340, the simulation file is edited based on the inputs. The simulation file 130 may be edited by the API component 111 using the data provided in the inputs 119. In some embodiments, the API may include a plurality of functions or modules that each correspond to a different part or aspect of the simulation file 130. Each module may receive inputs 119 corresponding to its part of the simulation file 130 and may edit the simulation file 130 according to the inputs 119. The modules may include a model module, a materials module, a physics module, a boundary conditions module, a simulation inputs module, and a timing parameters module. More or fewer modules may be supported.

At 350, the simulation file is transmitted to the simulation computing device. The simulation file 130 may be transmitted by the execution component 115 to the simulation computing device 140 via the network 120. Depending on the embodiment, simulation file 130 may be encrypted by the execution component 115 prior to being transmitted.

At 360, the simulation is performed at the simulation computing device. The simulation corresponding to the simulation file 130 may be performed on one or more nodes 145 of the simulation computing device in parallel. Depending on the embodiment, each node 145 may execute a portion of the simulation in a standard container installed in each node 145.

At 380, results of the simulation are provided. The results 160 may be provided to the originating computing device 105 through the network 120 by the results component 117. The results 160 may be encrypted. Alternatively, the results 160 may be stored by the results component 117 for later retrieval by the user and/or application 107. The application 107 may render or otherwise present the results 160 to the user on the originating computing device 105.

Figure 4:
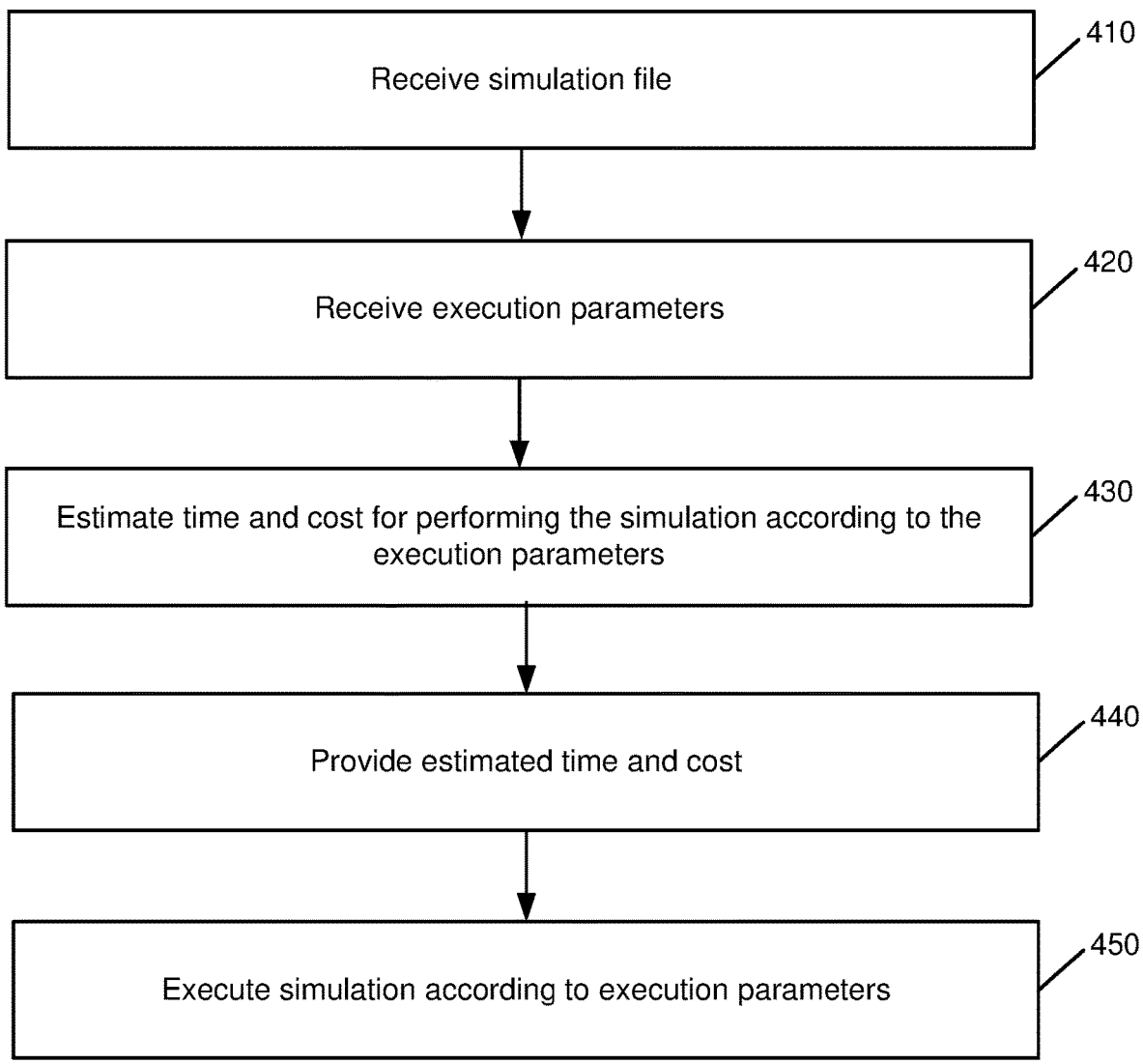
FIG. 4 is an operational flow of an implementation of a method for executing a simulation according to execution parameters.

FIG. 4 is an operational flow of an implementation of a method 400 for executing a simulation according to execution parameters. The method 400 may be implemented by simulation engine 110 and the simulating computing device.

At 410, a simulation file is received. The simulation file 130 may be received by the cost component 113 of the simulation engine 110. The simulation file 130 may have been generated by the API component 111 based on inputs 119 provided by a user of an application 107. The application 107 may be an engineering application or software such as a CAD application.

At 420, execution parameters are received. The execution parameters may be received by the execution component 115 from the user associated with the application 107. The execution parameters may be related to how the user desires the simulation represented by the simulation file 130 to be executed by a simulation computing device 140. The execution parameters may specify information such as a deadline for the simulation to be completed, how many nodes 145 should be used for the simulation, etc. Other information may be included.

At 430, a time and a cost for executing the simulation according to the execution parameters are estimated. The time and cost may be estimated by the cost component 113. Depending on the embodiment, the estimates may be based on the execution parameters and information provided by the host or entities that are associated with the simulation computing device 140 such as a cost per unit of computing time or resources. The estimates may be further based on the complexity of the model 210 and other parts of the simulation file, as well as the number of nodes 145 of the simulating computing device 140 that are available for execution.

At 440, the estimated time and cost are provided. The time and cost may be provided by the execution component 115 to the user of the application 107. Depending on the embodiment, the estimated time and cost may be displayed to the user in the application 107, and the user may either accept or reject the execution of the simulation according to the estimated time and cost.

At 450, the simulation is executed according to the execution parameters. The simulation may be executed by the simulation computing device 140 according to the simulation file 130.

Figure 5:
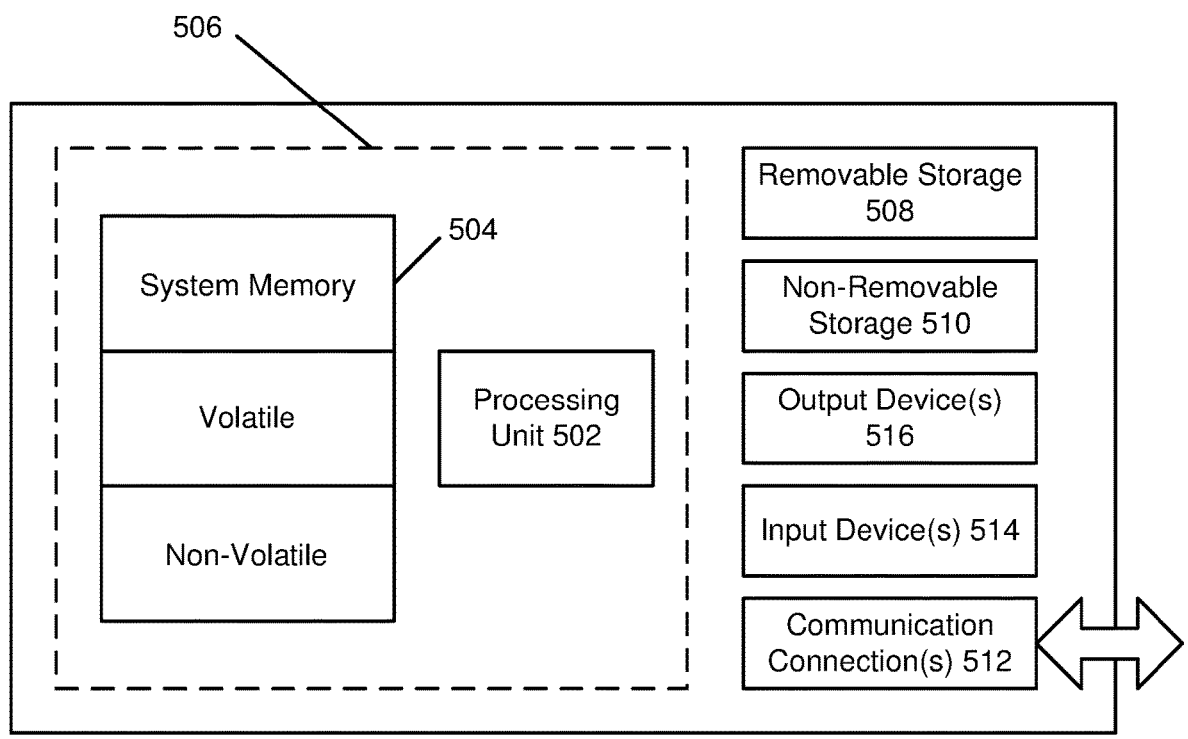
FIG. 5 shows an exemplary computing environment in which example embodiments and aspects may be implemented.

FIG. 5 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 5, an exemplary system for implementing aspects described herein includes a computing device, such as computing device 500. In its most basic configuration, computing device 500 typically includes at least one processing unit 502 and memory 504. Depending on the exact configuration and type of computing device, memory 504 may be volatile (such as random access memory (RAM)), non-volatile (such as read-only memory (ROM), flash memory, etc.), or some combination of the two. This most basic configuration is illustrated in FIG. 5 by dashed line 506.

Computing device 500 may have additional features/functionality. For example, computing device 500 may include additional storage (removable and/or non-removable) including, but not limited to, magnetic or optical disks or tape. Such additional storage is illustrated in FIG. 5 by removable storage 508 and non-removable storage 510.

Computing device 500 typically includes a variety of computer readable media. Computer readable media can be any available media that can be accessed by the device 500 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 504, removable storage 508, and non-removable storage 510 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media may be part of computing device 500.

Computing device 500 may contain communication connection(s) 512 that allow the device to communicate with other devices. Computing device 500 may also have input device(s) 514 such as a keyboard, mouse, pen, voice input device, touch input device, etc. Output device(s) 516 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for abstracting an engineering simulation workflow, comprising:
providing a simulation file, wherein the simulation file comprises a plurality of parameters comprising a model, materials parameters, physics parameters, boundary condition parameters, simulation parameters, and timing parameters;
providing an application programming interface (API) configured to interface with the simulation file, wherein the API comprises a plurality of modules configured to receive inputs from an originating computing device and edit the simulation file based on the received inputs;
transmitting the simulation file to a simulation computing device over a network;
estimating a time and cost for executing a simulation using the simulation file on the simulation computing device based on the simulation file;
providing the estimated time and cost to the originating computing device;
receiving an acceptance of the provided estimated cost and time; and
in response to receiving the acceptance, performing a simulation using the simulation file at the simulation computing device.

2. The method of claim 1, wherein the simulation computing device is a computing cluster comprising a plurality of nodes.

3. The method from claim 2, wherein performing the simulation of the simulation file comprises performing different portions of the simulation in parallel using the computing cluster.

4. The method of claim 1, wherein the API is further configured to generate one or more standardized containers for performing the simulation, the method further comprising transmitting the one or more standardized containers over the network to the computing cluster for installation on the simulation computing device.

5. The method of claim 1, wherein the API is embedded inside engineering software running on the originating computing device.

6. The method of claim 1, wherein the simulation file is transmitted to the simulation computing device over the network via a network interface.

7. The method of claim 1, further comprising:
providing execution preferences for the simulation file; and
performing the simulation using the simulation file at the simulation computing device according to the execution preferences.

8. The method of claim 7, wherein the network interface is embedded inside engineering software running on the originating computing device.

9. The method of claim 1, wherein the plurality of modules include a computer-aided design (CAD) model module, a materials module, a physics module, a boundary conditions module, a simulation inputs module, and a timing parameters module.

10. The method of claim 1, further comprising estimating the time and the cost for executing the simulation based on the simulation file and a service level agreement for the simulation.

11. The method of claim 10, wherein the results are provided in a standardized format for visualization on the originating computing device.

12. The method of claim 1, further comprising estimating the time and the cost for executing the simulation based on the simulation file, a desired number of nodes of the simulation computing device, and a cost charged by an owner of the simulation computing device.

13. A non-transitory computer readable recording medium for abstracting an engineering simulation workflow having computer-executable instructions stored thereon that, when executed by a processor, cause the processor to:
provide an application programming interface (API) configured to interface with a simulation file, wherein the simulation file comprises a plurality of parameters comprising a model, materials parameters, physics parameters, boundary condition parameters, simulation parameters, and timing parameters, wherein the API comprises a plurality of modules configured to receive inputs from an originating computing device and edit the simulation file based on the received inputs;
receive the simulation file through the API from the originating computing device;
transmit the simulation file to a simulation computing device over a network;
estimate a time and cost for executing a simulation using the simulation file on the simulation computing device based on the simulation file;
provide the estimated time and cost to the originating computing device;
receive an acceptance of the provided estimated cost and time; and
in response to receiving the acceptance, perform a simulation using the simulation file at the simulation computing device.

14. The computer readable recording medium of claim 13, wherein the simulation computing device is a computing cluster comprising a plurality of nodes.

15. The computer readable recording medium of claim 14, wherein performing the simulation of the simulation file comprises performing different portions of the simulation in parallel using the computing cluster.

16. The computer readable recording medium of claim 13, wherein the API is further configured to generate one or more standardized containers for performing the simulation, the method further comprising transmitting the one or more standardized containers over the network to the computing cluster for installation on the simulation computing device.

17. The computer readable recording medium of claim 13, wherein the API is embedded inside engineering software running on the originating computing device.

18. The computer readable recording medium of claim 13, wherein the simulation file is transmitted to the simulation computing device over the network via a network interface.

19. The computer readable recording medium of claim 13, wherein the network interface is configured to encrypt the simulation file.

20. A system comprising:
- at least one processor; and
- a memory having computer-executable instructions stored thereon that, when executed by the at least one processor, cause the at least one processor to:
- provide an application programming interface (API) configured to interface with a simulation file, wherein the simulation file comprises a plurality of parameters comprising a model, materials parameters, physics parameters, boundary condition parameters, simulation parameters, and timing parameters, wherein the API comprises a plurality of modules configured to receive inputs from an originating computing device and edit the simulation file based on the received inputs;
- receive the simulation file through the API from the originating computing device;
- transmit the simulation file to a simulation computing device over a network;
- estimate a time and cost for executing a simulation using the simulation file on the simulation computing device based on the simulation file;
- provide the estimated time and cost to the originating computing device;
- receive an acceptance of the provided estimated cost and time; and
- in response to receiving the acceptance, perform a simulation using the simulation file at the simulation computing device.

* * * * *